UNITED STATES PATENT OFFICE.

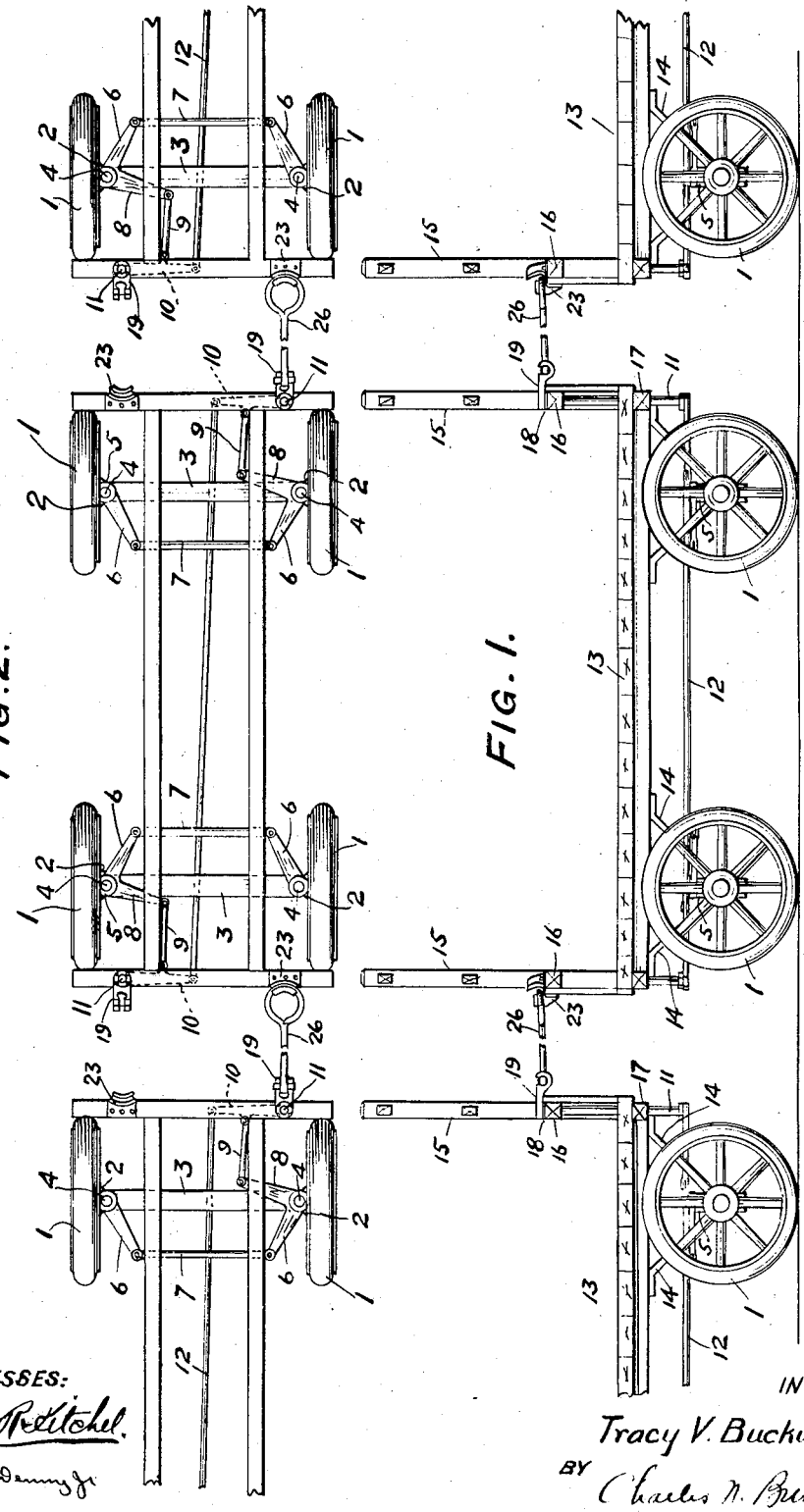

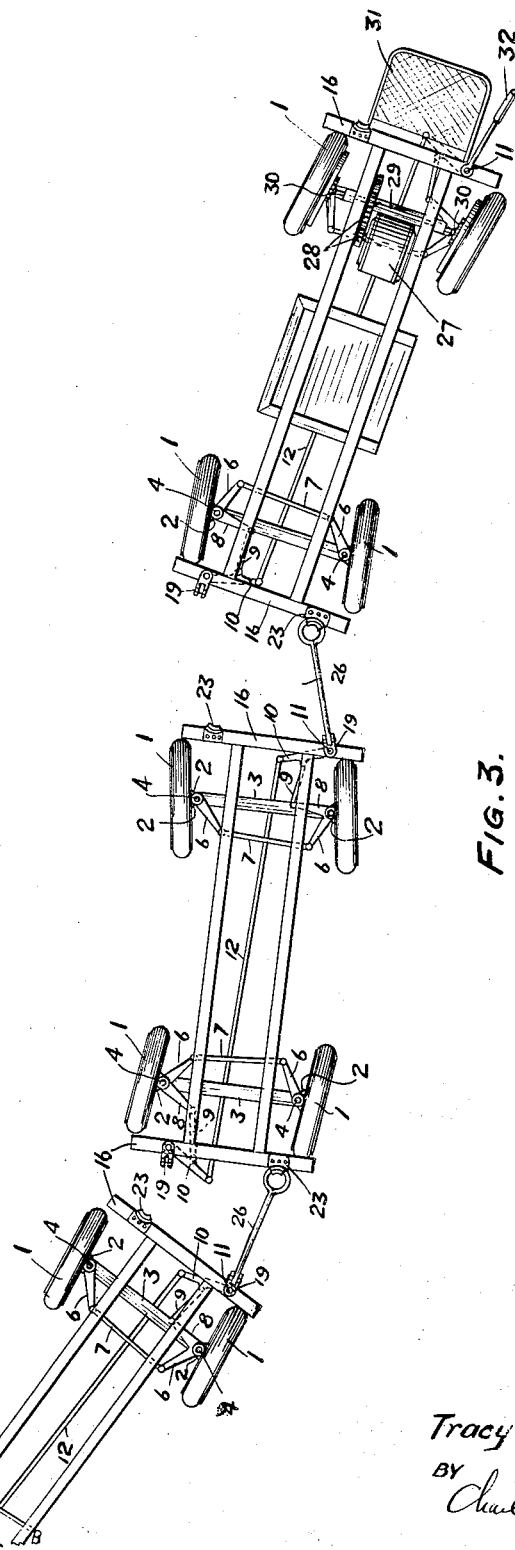

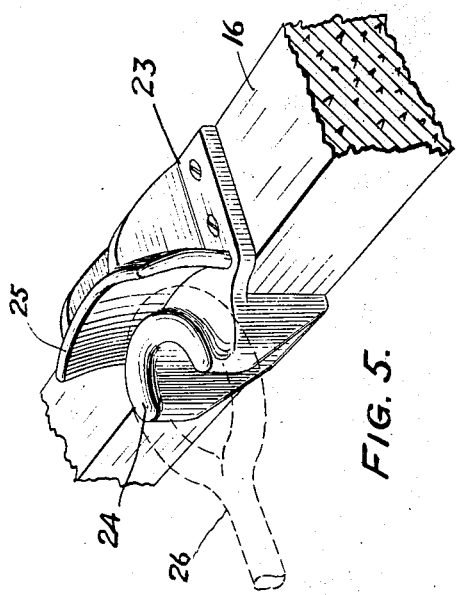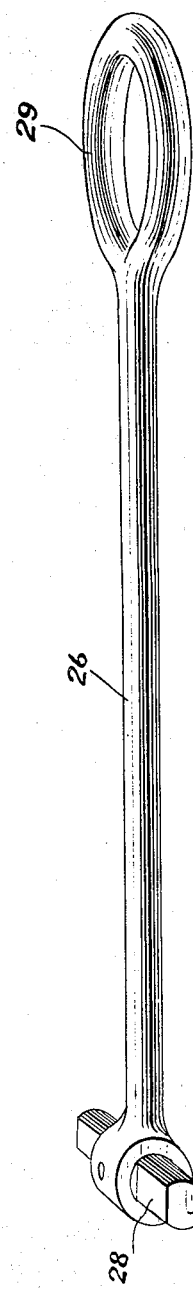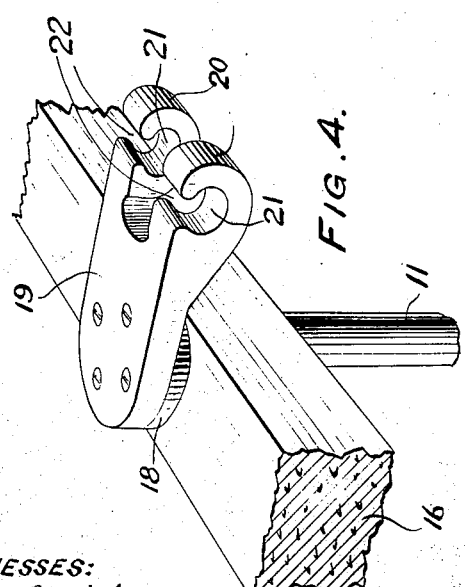

TRACY V. BUCKWALTER, OF ALTOONA, PENNSYLVANIA, ASSIGNOR OF ONE-HALF TO AXEL S. VOGT, OF PHILADELPHIA, PENNSYLVANIA.

COMBINED COUPLING AND STEERING MECHANISM.

1,024,675. Specification of Letters Patent. Patented Apr. 30, 1912.

Application filed March 9, 1911. Serial No. 613,379.

*To all whom it may concern:*

Be it known that I, TRACY V. BUCKWALTER, a citizen of the United States, residing at Altoona, in the county of Blair and State of Pennsylvania, have invented a Combined Coupling and Steering Mechanism, of which the following is a specification.

My invention is designed for coupling and steering vehicles so that they will substantially track in traveling, regardless of the course. It is particularly applicable in the use of baggage trucks where several trailers are moved by a motor truck in constricted and devious ways.

In the preferred construction, wheels at opposite ends of the respective trucks are connected with knuckles whereby they can oscillate about vertical axes; wheels of each truck are coupled together by steering mechanism so that the wheels at opposite ends are turned in opposite directions, and the steering mechanism of each trailer truck is coupled to an adjacent truck which operates the steering mechanism to direct the following truck in substantially the course of the preceding truck.

It is an object of my invention to provide simple, efficient and convenient apparatus for the foregoing purposes.

In the drawings, Figure 1 is a side elevation representing a truck and the ends of two trucks connected therewith in illustration of my invention; Fig. 2 is a plan view of the construction shown in Fig. 1 with the platforms removed to show the steering mechanisms; Fig. 3 is a plan view representing skeletons of a motor truck and two trailer trucks having my improvements applied thereto for illustrating the operation; Fig. 4 is a perspective view of a steering head applied to a journaled steering post; Fig. 5 is a perspective view of a coupling shoe and its support in combination with the eye of a coupling and steering lever; and Fig. 6 is a perspective view of a coupling and steering lever.

As shown in the drawings, the mechanism comprises traction wheels 1 having knuckles 2 connected with the beams or axles 3 of the respective trucks, the knuckles having vertical journals 4 revoluble in bearings 5 of the respective members 3. Each knuckle has an arm 6 fixed thereto and the arms of each pair of wheels are pivotally connected to and coupled together by a rod 7. Diagonally disposed wheels of each truck have arms 8 fixed to their respective knuckles and each arm 8 is pivotally connected to a rod 9 which is pivotally connected to a lever 10 fixed to a steering post 11. The ends of the levers 10 of each truck are pivotally connected to coupling rods 12.

The truck platform 13, carried through the struts 14 by the axles 3, has thereon end uprights 15 connected by cross pieces 16, the platform and cross pieces carrying bearings 17 and 18 in which the respective steering posts are journaled. A steering head 19, fixed to the top of each steering post, is supported by and turns on the bearing 18, the head having bifurcations providing parallel hooks 20 with cylindrical bearings 21 therein entered by the contracted top passages 22. A shoe 23 is fixed on each of the cross pieces 16, the shoe comprising the curved hook 24 and the curved abutment 25 extending above the hook and receding therefrom from the top downwardly.

The coupling and steering lever 26 has fixed at one end thereof the cylindrical pin 27 with parallel end surfaces 28 produced by removing segments, and at the other end an eye 29; the ends of the pin being adapted to pass through the openings 22 of the hooks 20 into the bearings 21 when the lever is held in the vertical position and being locked in place when the lever is turned to the horizontal and operative position. The eye of the lever is adapted for engaging the hook 24, being guided into engaging position by the abutment 25 which tends to deflect it downwardly over the hook and provides a thrust bearing therefor.

As each end of each truck is provided with a head 19 and a shoe 23 placed on opposite sides of the longitudinal axis of the truck and at equal distances therefrom, the adjacent ends of two trucks, regardless of how the trailers are turned, will be in position for engaging a head and shoe together by means of a coupling and steering lever.

The motor truck, as shown, is similar in construction to the trailer trucks excepting that it carries a motor 27 which acts through gearing 28 and a shaft 29 flexibly connected with the gearing 30, whereby a pair of wheels of the truck are driven, the operator standing on the platform 31 and handling the main steering lever 32 fixed to the steering post 11 of this truck.

The parts of the steering mechanism of each truck are so proportioned that they shift the wheels through positions substantially at right angles to radii drawn from a center. The coupling and steering members of the combined trucks are so proportioned that the wheels of each trailer will follow substantially the track of the preceding truck.

Having described my invention, I claim:

1. A pair of trucks each having wheels at its ends, knuckles whereby said wheels are adapted to oscillate on vertical axes, steering mechanism connecting said wheels, and operating means comprising a journaled member having a vertical axis offset from the center at each end thereof, in combination with mechanism comprising a connecting lever whereby either end of one truck can be coupled to either operating means of the other.

2. A truck having end wheels adapted to turn on vertical axes and steering mechanism for shifting said wheels simultaneously, said mechanism comprising a journaled post, a coupling mechanism fixed thereto, and a lever having a coupling member connected to said coupling member first named, in combination with a second truck and means carried by said second truck for engaging said lever.

3. A truck having steering mechanism comprising a journaled post, a journal bearing fixed thereto, a second truck having a shoe thereon, and a lever having means for connecting said journal bearing and shoe whereby said second truck steers said first truck.

4. A truck having steering mechanism comprising a journaled post with coupling means thereon, a second truck having a shoe comprising a hook and an abutment, and a lever having means for engaging said coupling means and means for engaging said abutment and hook.

5. A truck having steering mechanism comprising a journaled post with a hook thereon, a second truck having a shoe comprising a hook and an inclined abutment, and a lever having means for engaging said first named hook and an eye for engaging said abutment and said second named hook.

In witness whereof I have hereunto set my name this 8th day of March, 1911, in the presence of the subscribing witnesses.

TRACY V. BUCKWALTER.

Witnesses:
  Jos. G. Denny, Jr.,
  Gilbert S. Barlage.